United States Patent [19]

Itoh et al.

[11] 4,230,068
[45] Oct. 28, 1980

[54] APPARATUS USED IN CONTINUOUS PROCESS FOR ELECTROSTATIC COATING WITH PULVERIZED MATERIAL

[75] Inventors: Tsutomu Itoh, Tokyo; Kenji Ouchi; Nobuo Furuya, both of Chiba; Takeo Shimizu, Chofu, all of Japan

[73] Assignee: Onoda Cement Company, Ltd., Onoda, Japan

[21] Appl. No.: 956,999

[22] Filed: Oct. 31, 1978

[51] Int. Cl.² .................... B05B 5/02; B05B 7/14
[52] U.S. Cl. .................... 118/634; 118/102; 118/109; 118/326; 118/621; 118/629; 118/630; 118/638; 427/25; 427/27; 427/33; 427/348; 427/350, 427/369
[58] Field of Search .......... 118/50.1, 50, 49.1, 118/48, 56, 102, 326, 621, 629, 630, 634, 638; 427/25, 27, 33, 350, 369, 348

[56] References Cited

U.S. PATENT DOCUMENTS

| | | | |
|---|---|---|---|
| 2,442,986 | 6/1948 | Ransburg | 118/630 |
| 2,625,590 | 1/1953 | Peeps | 118/630 |
| 3,514,803 | 6/1970 | Turney | 118/50 |
| 3,646,909 | 3/1972 | Cole et al. | 118/629 |
| 3,918,641 | 11/1975 | Lehmann et al. | 118/50 |
| 3,976,031 | 8/1976 | Itoh | 118/629 |
| 3,991,710 | 11/1976 | Gourdino et al. | 118/630 |

FOREIGN PATENT DOCUMENTS

| | | | |
|---|---|---|---|
| 2430990 | 1/1975 | Fed. Rep. of Germany | 427/33 |
| 1025492 | 4/1966 | United Kingdom | 427/195 |

*Primary Examiner*—Charles L. Bowers, Jr.
*Attorney, Agent, or Firm*—Wenderoth, Lind & Ponack

[57] ABSTRACT

This invention relates to a continuous process for electrostatically coating a substantially axially symmetrical object with pulverized material, characterized by conveying said object by means of a conveyor-type holding device into an electrostatic coating chamber equipped with silent discharge plate electrodes on both sides of the chamber walls: feeding electrically charged pulverized material into said chamber: electrostatically coating said object with said pulverized material by the action of silent discharge from said electrodes: and removing surplus pulverized material from the specific parts of said object by suction.

This invention further relates to an apparatus used for continuously electrostatically coating a substantially axially symmetrical object with pulverized synthetic resin, characterized by comprising (i) an electrostatic coating chamber where said pulverized synthetic resin is coated on the surface of said object maintained at a temperature below the melting point of said resin, which object has been conveyed into said chamber by means of a holding device and (ii) a device for removing surplus pulverized resin from the specific parts of said object by suction in order to electrostatically coat the desired part only.

4 Claims, 9 Drawing Figures

APPARATUS USED IN CONTINUOUS PROCESS FOR ELECTROSTATIC COATING WITH PULVERIZED MATERIAL

This is a division, of application Ser. No. 849,532, filed Nov. 8, 1977, now abandoned.

BACKGROUND OF THE INVENTION

This invention relates to a continuous process for electrostatically coating glass bottles, and other axially symmetrical objects with pulverized material, and an apparatus used in said process. More particularly, this invention relates to a continuous process for electrostatically coating an axially symmetrical object with pulverized synthetic resin and an apparatus used in said process, said process being characterized by electrostatically coating pulverized synthetic resin on the surface of an axially symmetrical object maintained at a temperature below the melting point of the pulverized synthetic resin, removing surplus pulverized synthetic resin (hereinafter referred to as "surplus powder") from the desired parts and then heating the pulverized resin-coated object so as to set and form a resin film on the surface of the axially symmetrical object.

Recently, it is desired to coat a film of synthetic resin on glass bottles of carbonated drinks such as Coca-Cola and the like in order to preventing the glass bottles from breaking during handling and/or because of a rise in internal pressure in the bottles due to sunlight. According to the conventional electrostatic coating process, it is usually necessary to preheat a glass bottle to a temperature above the melting point of the pulverized synthetic resin since a glass bottle is an electric insulator. That is, the conventional electrostatic coating process comprises preheating a glass bottle to a temperature above the melting point of the resin in order to lower the electrical resistance of glass, electrostatically coating pulverized synthetic resin on the preheated glass surface and then post-heating the resin-coated glass bottle to form a film of the resin on the surface of the glass bottle. However, according to this conventional process, it is almost impossible to remove the surplus pulverized resin adhering to the undesired part since the glass bottle is preheated. In order to prevent the pulverized resin from adhering to the undesired part (for example the mouth of the glass bottle), it is suggested to carry out the electrostatic coating while applying a gaseous jet stream to the vicinity of the mouth of the bottle to mask the mouth. However, even by this method, it is substantially impossible to completely mask the mouth of the bottle, and consequently the pulverized resin often adheres to the mouth part of the bottle covered by the cap, thus producing various serious problems such as incomplete capping or decapping and the incorporation of the resin film waste into the contents of the bottle. Moreover, the pulverized resin also adheres to the holding arm or chuck of the holding device, and due to the accumulated and fired resin, the operation of the apparatus must sometimes be suspended. In addition to the above mentioned disadvantages, the thickness of the resin film formed on the upper part of the bottle tends to be uneven and thin, thus resulting in the breakage or exfoliation of the resin film during washing or transportation of the resin-coated bottles. This is a serious problem for returnable glass bottles since the life of the glass bottle is shortened. Furthermore, for the purpose of improving the commercial value of glass bottles, the even coating of the resin film with uniform thickness is required. However, the conventional process comprising electrostatically coating the preheated glass bottle produces the above mentioned disadvantages and does not satisfy this requirement.

SUMMARY OF THE INVENTION

One object of this invention is to remove the above mentioned disadvantages of the conventional process and to provide a continuous process for electrostatically coating a substantially axially symmetrical object with pulverized material, characterized by conveying said object by means of a conveyer-type holding device into an electrostatic coating chamber equipped with silent discharge plate electrodes on both sides of the chamber walls, feeding electrically charged pulverized material into said chamber, electrostatically coating said object with said pulverized material by the action of silent discharge from said electrodes and removing surplus pulverized material from the specific part of said object by suction.

Another object of this invention is to provide an apparatus used for continuously electrostatically coating a substantially axially symmetrical object with pulverized synthetic resin, which comprises (i) an electrostatic coating chamber where said pulverized synthetic resin is coated on the surface of said non-preheated object maintained at a temperature below the melting point of said resin, which object has been conveyed into said chamber by means of a conveyer-type holding device, and (ii) a device for removing surplus pulverized resin from the specific part of said object by suction. By means of the apparatus of this invention, the pulverized resin is electrostatically coated on the desired part only in such a manner as to form a pulverized resin layer having a uniform thickness and a clear boundary. The resin-coated object is then heated to produce an object coated with synthetic resin having a high endurance. Thus, the apparatus of this invention provides a resin-coated object having a high commercial value at a high efficiency.

DESCRIPTION OF THE PREFERRED EMBODIMENTS

The accompanying drawings illustrate the preferred embodiments of this invention.

As shown in the accompanying drawings, the apparatus used for practicing the process of this invention comprises (1) an electrostatic coating chamber where pulverized synthetic resin is coated on the surface of a glass bottle conveyed into said chamber by means of a chuck of a movable holding device, and (2) a device for removing surplus powder from the specific parts including the mouth and/or bottom which are not desired to be coated.

Figures 1, 2, 3:
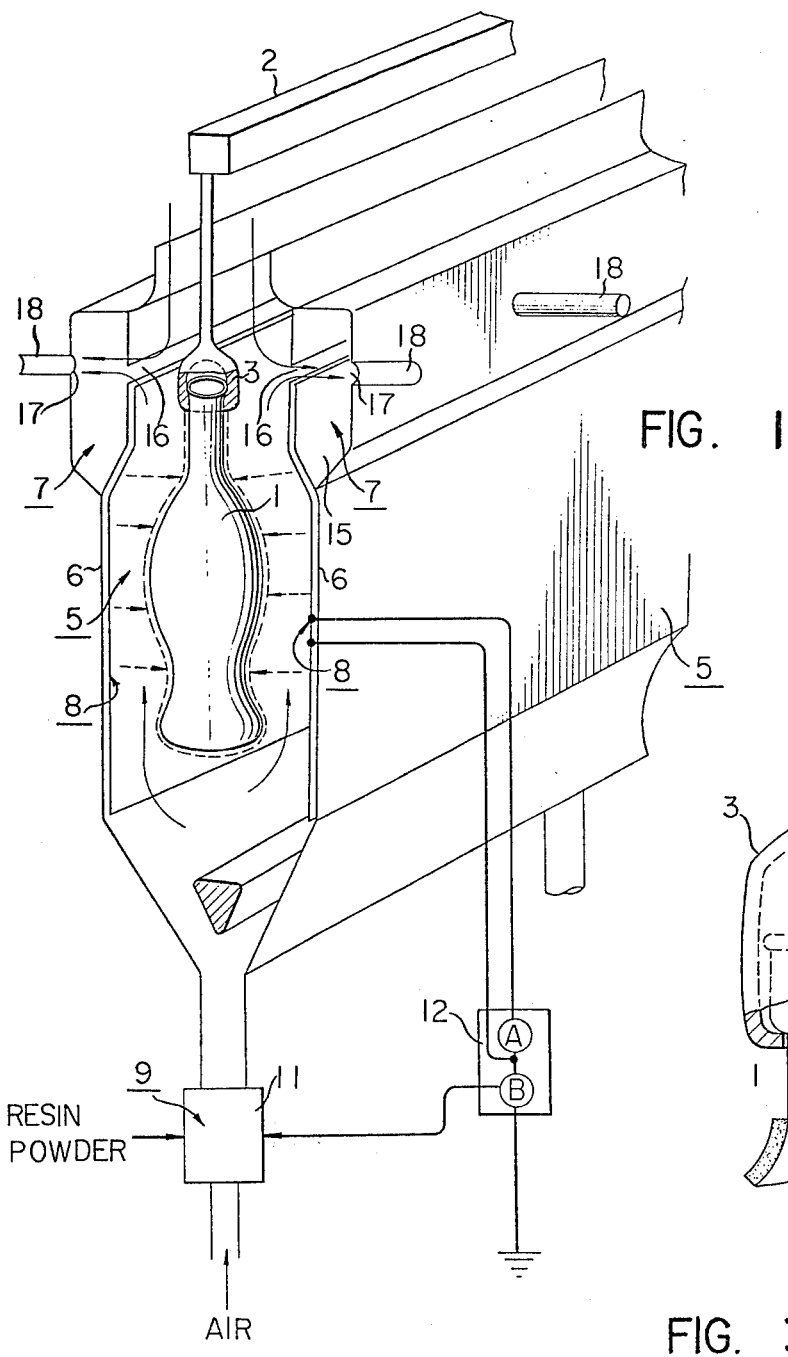
FIG. 1 shows an outline of an apparatus for electrostatically coating a glass bottle with pulverized material in accordance with the present invention.
FIG. 2 shows a sectional view of an upper suction slit used in the device for removing surplus powder.
FIG. 3 shows a sectional view of a lower suction slit used in the device for removing surplus powder.
Figure 4:
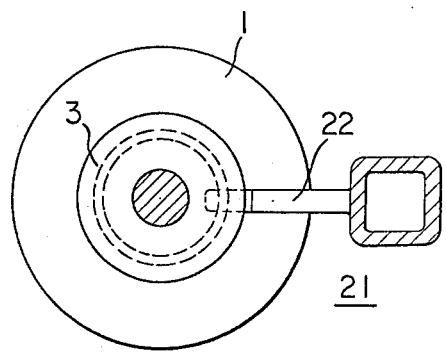
FIG. 4 shows a plane view of FIG. 2.

As can be seen from FIG. 1, glass bottles 1 ready to be electrostatically coated are fed one by one by a bottle-feeding device (not shown). The mouth of the bottle 1 is grasped by a chuck 3 of a chain conveyor type holding device 2, and the bottle 1 suspended by the device 2 is conveyed to an inlet of an electrostatic coating chamber 5 by means of the holding device 2. The chamber 5 is composed of a long and slender casing 6 (a section of which is shown in FIG. 1) having an outlet at the far end, and the bottle 1 suspended by the holding device 2 is electrostatically coated with pulverized synthetic resin while passing through the chamber 5. The top of the casing 6 is open like a slit in such a manner as to permit the passage of the chuck 3 of the holding device 2. The casing 6 of the chamber 5 has suction parts 7 on both sides of the upper part of the casing, silent discharge plate electrodes 8 on both sides of the casing and a pulverized resin feeder 9 at the bottom of the casing which feeds electrically pre-charged pulverized resin into the casing 6. The pulverized resin feeder 9 is preferably disposed at appropriate intervals depending on the length of the casing 6.

The pulverized resin feeder 9 includes an electrical pre-charging device 11 where pulverized resin is pre-charged by corona discharge, contact charging or other appropriate method in the polarity the same as that of said silent discharge plate electrode, and feeds the pre-charged pulverized resin into the casing 6 by means of an air flow. The pre-charged pulverized resin thus introduced into the casing 6 is electrostatically deposited on the glass bottle 1 passing through the casing 6 by the action of an electric field flowing from the silent discharge plate electrodes 8 to the glass bottle 1, thus forming a well charged tight pulverized resin layer on the surface of the glass bottle. Electric current or voltage of the silent discharge plate electrodes 8 and the pre-charging device 11 is controlled by an appropriate electric controller 12. As disclosed in Japanese Patent Application Laid Open No. 51-8347, the silent discharge plate electrodes 8 are composed of parallel filament electrodes embedded in insulation plates. The silent discharge is caused on the surface of the plates by applying AC voltage between the parallel filament electrodes, and a minute discharge current and electric field flowing from the plates to the glass bottle are produced by superimposing DC voltage on the AC voltage while preventing the pulverized resin from adhering to the surface of the plates.

The suction part 7 has a suction chamber 15 positioned on both sides of the upper part of the casing 6, a suction inlet 16 on the inner side of the suction chamber 15 and an outlet 17 on the outer side of the suction chamber 15, the outlet 17 being connected to an appropriate dust collector and a suction fan (not shown) by way of a suction pipe 18. Accordingly, the suction part 7 prevents pulverized resin from flowing out through the slit-like opening of the casing 6, and collects for reuse the pulverized resin which is not deposited on the surface of the bottle.

The casing 6 may additionally have on its sides a pulverized resin feeder including a pre-charging device and having the same function as the above mentioned pulverized resin feeder 9. The additional pulverized resin feeder feeds resin powder onto the glass bottle from the lateral direction, and is useful for producing an especially thick pulverized resin layer on a specified part of the bottle or adjusting the thickness of the layer depending on the shape of the bottle.

Following the electrostatic coating chamber 5, a suction slit device 21 for removing "surplus powder" is provided in such a manner as to remove powder from the specific parts including the top and/or the bottom of the bottle. As can be seen from FIGS. 2 to 5, the suction slit device 21 comprises suction slits 22 and 23 respectively positioned close to the top and the bottom of the bottle, the suction slits 22 and 23 being connected to an appropriate dust collector and a suction fan to remove surplus powder from the specific parts and collect the resin powder. When the bottle 1 electrostatically coated with pulverized resin in the chamber 5 is conveyed to the suction slit device 21, the chuck 3 of the holding device 2 is rotated by an appropriate means, thus removing the powder from the specific parts including the head and/or bottom.

Figure 6:
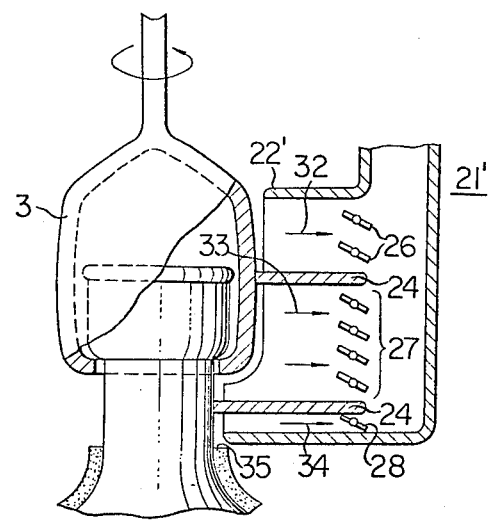
FIG. 6 shows a modification type of the upper suction slit for removing surplus powder as shown in FIG. 2.
Figure 5:
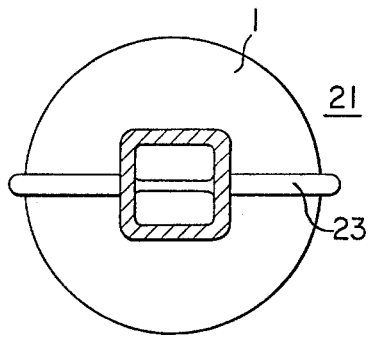
FIG. 5 shows a bottom view of FIG. 3.
Figure 7:
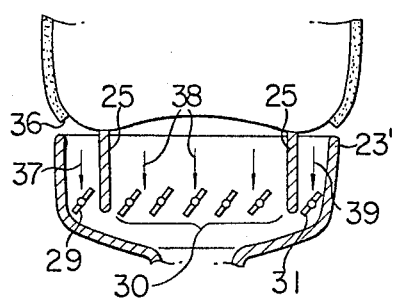
FIG. 7 shows a modification type of the lower suction slit for removing surplus powder as shown in FIG. 3.

As can be seen from FIGS. 6 and 7, the amount of suction draft can be controlled in such a manner as to more satisfactorily raise the suction efficiency depending on the part and shape of the bottle by dividing the suction mouth of upper and lower suction slits 22' and 23' of the "surplus powder"-removing device 21' with partition plates 24 and 25 and providing draft controllers 26 to 31 at each suction mouth. Furthermore, the partition plates 24 and 25 should preferably protrude to a small degree from the suction mouth level in such a manner as to work as a spacer between the suction slits and the chuck of the holding device, the top and the bottom of the bottle to retain an appropriate gap between them.

Referring to FIG. 6, it is generally preferable to make suction draft rates 32 and 33 relatively high for the purpose of completely removing powder on the chuck 3 of the holding device 2, while suction draft rate 34 for producing a sharp boundary 35 at the upper end of the pulverized resin layer should be determined depending on the amount of electrical charge and the adhesive force of the pulverized resin layer but is generally made relatively lower as compared to the suction draft rates 32 and 33. This situation is also true with regard to suction draft rates 37 and 39 for producing a sharp boundary 36 and suction draft rate 38 for completely removing surplus powder from the center part of the bottom as shown in FIG. 7. That is, suction draft rates 37 and 39 are relatively lower, while suction draft rate 38 is relatively higher. It should be noted that if desired, the surplus powder-removing system of this invention can be optionally applied to parts other than the mouth and the bottom of the bottle.

Figure 8:
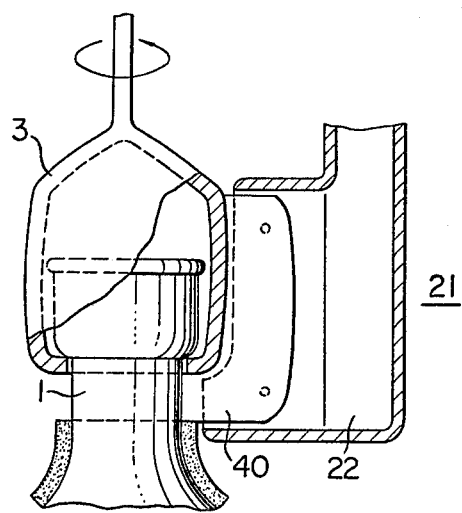
FIG. 8 shows a modification type of the upper suction slit of FIG. 2, which has a squeegee.
Figure 9:
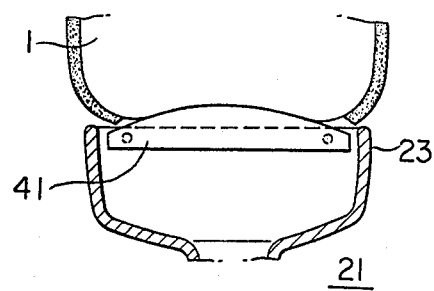
FIG. 9 shows a modification type of the lower suction slit of FIG. 3, which has a squeegee.

As can be seen from FIGS. 8 and 9, the suction slits 22 and 23 may optionally have squeegees 40 and 41 made of an elastic material such as rubber to facilitate the removal of the surplus powder. The suction slits 22 and 23 may also be equipped with an elastic element such as a spring in such a manner as to constantly maintain intimate contact between the squeegee and the chuck or the specific parts of the bottle from which surplus powder is to be removed.

As mentioned above, according to the present invention, pulverized resin is electrostatically coated on the surface of a glass bottle in such a manner as to produce a tight pulverized resin layer having a uniform thickness which is well charged and strongly adheres to the glass surface, and surplus powders are satisfactorily removed, thus producing a sharp boundary. The pulverized resin-coated bottle is then post-heated to produce a strong resin film having a uniform thickness on the bottle surface, thereby prolonging the life of the bottle and increasing its commercial value. Moreover, according to the present invention, surplus powder on the holding device is completely removed, the apparatus can be continuously operated for a long time, thus raising productivity very high.

The present invention is illustrated with regard to the case of electrostatically coating a glass bottle with pulverized resin, but it should be noted that the present invention can also be applied to other substantially axially symmetric objects such as bowling pins and the like. Also, in addition to synthetic resins, other inorganic powders such as enamel frit powders and the like can also be used in the present invention.

What we claim is:

1. An apparatus used for continuously electrostatically coating an axially symmetrical object with pulverized synthetic resin, which comprises
   (i) an electrostatic coating chamber where said pulverized synthetic resin is coated on the surface of said object maintained at a temperature below the melting point of said resin, which object has been conveyed into said chamber by means of a holding device; said electrostatic coating chamber comprising a long and slender casing permitting the passage of said object therethrough, silent discharge plate electrodes on both sides of said casing, a suction part at the upper part of said casing to recover surplus pulverized resin which is not coated on said object, and a pulverized resin feeder having an electrically precharging device positioned at the lower part of said chamber body to electrically precharge said pulverized resin in the same polarity as that of said silent discharge plate electrode and to feed the electrically pre-charged pulverized material into the lower part of said chamber in such a manner as to flow upwards; said silent discharge being caused on the surface of the plate electrode by applying an AC voltage, and superimposing a DC voltage on the AC voltage to cause a minute discharge current and electric field to flow from the plate electrode to the object being produced; and
   (ii) a device for removing surplus pulverized resin from the specific parts of said object by suction to electrostatically coat the desired part only, said device comprising suction slit openings positioned close to the specific parts of said object from which the surplus pulverized resin is to be removed, and wherein said suction slit openings have squeegees made of an elastic material to facilitate the removal of the surplus pulverized resin.

2. The apparatus according to claim 1, wherein said suction slit openings are positioned close to not only the said specific parts of said object but also to the chuck of said holding device.

3. The apparatus according to claim 1, wherein the plastic material of said squeegees is rubber.

4. The apparatus according to claim 1, wherein said suction slit openings are equipped with an elastic element such as a spring in such a manner as to constantly maintain intimate contact between said squeegee and the chuck and/or the specific parts of the object from which surplus resin is to be removed.

* * * * *